V. KUBELKA.
TIRE.
APPLICATION FILED OCT. 26, 1920.

1,383,822.

Patented July 5, 1921.

WITNESSES
Edw. Thorpe
F. J. Foster

INVENTOR
VRATISLAV KUBELKA
BY
ATTORNEYS

UNITED STATES PATENT OFFICE.

VRATISLAV KUBELKA, OF RIDGEWOOD, BROOKLYN, NEW YORK.

TIRE.

1,383,822.  Specification of Letters Patent.  Patented July 5, 1921.

Application filed October 26, 1920. Serial No. 419,684.

*To all whom it may concern:*

Be it known that I, VRATISLAV KUBELKA, a citizen of the United States, and a resident of the city of New York, Ridgewood, borough of Brooklyn, in the county of Kings and State of New York, have invented a new and Improved Tire, of which the following is a full, clear, and exact description.

This invention relates to improvements in tires, an object of the invention being to provide a resilient filler for a tire shoe which will entirely do away with the necessity of using inner tubes. In other words the principal object of my invention is to provide a filler for shoes which will obviate the use of pneumatic tires on vehicles of all descriptions.

A further object is to provide a puncture proof tire construction which may be readily installed on vehicles of the various kinds which will be practical in construction, strong and durable in use and which will greatly prolong the life of the tire shoes commonly employed.

With these and other objects in view, the invention consists in certain novel features of construction and combinations and arrangements of parts as will be more fully hereinafter described and pointed out in the claims.

In the accompanying drawings.

Figure 1:
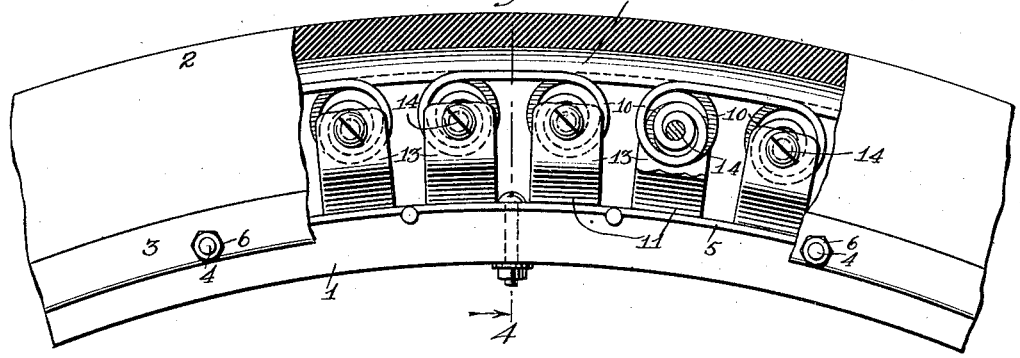
Figure 1 is a fragmentary view in side elevation of a wheel felly rim and shoe with parts of the rim and shoe broken away to illustrate my improved tire construction.

1 represents a wheel felly provided with a common form of clencher rim in which one of the clencher members is in the form of a demountable annular band 3. The band 3 is provided with openings which receive threaded studs 4 on the main rim section 5 and is clamped to the section 5 by means of nuts 6 located around the studs 4. Bolts 7 and nuts 8 are employed to secure the rim section 5 to the felly 1. The rim receives the usual form of tire shoe 2.

My invention resides in the provision of an annular resilient device which fills the shoe 2 and takes the place of the inner tube used with pneumatic tires.

The filler consists of an annular chain of spring links 9. The links 9 are of substantial inverted U-shape. The legs of the U form resilient coils 10. The links 9 are arranged preferably in alined groups of three (although I do not wish to be limited to any particular number). Each group of three links has its end coils 10 in alinement with the end coils of an adjacent group, the coils of one group of links fitting between the coils of another group with the resultant staggered arrangement shown clearly in Fig. 2.

Brackets 11 of substantially U-shape have their intermediate portion 12 located against the wheel rim, the arms 13 of the brackets 11 following the internal face of the shoe for a short distance and then projecting outwardly in a radial direction at right angles to the face of the rim straddling the alined coils 10 of two groups of links. The arms 13 of the brackets 11 are provided with alined openings registering with the coils 10. Bolts 14 are passed through the brackets and coils and secured in place by nuts 15. One of these brackets is provided at the juncture of each two groups of links, the bolts 14 associated with the brackets serving to pivotally connect each group of links to the adjacent groups.

Figure 2:
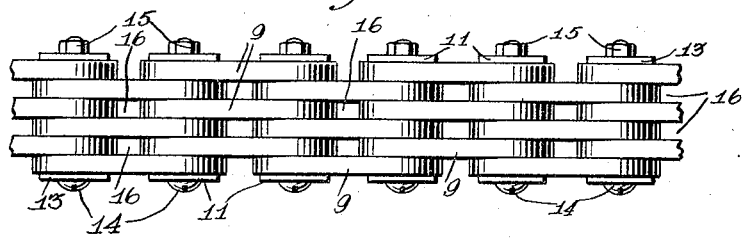
Fig. 2 is a fragmentary top plan view of my improved resilient chain with its associated brackets.
Figure 3:
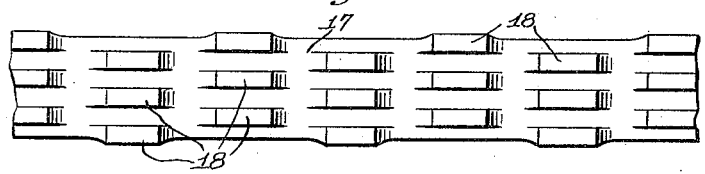
Fig. 3 is a fragmentary plan view of the inner face of my improved filler band.
Figure 4:
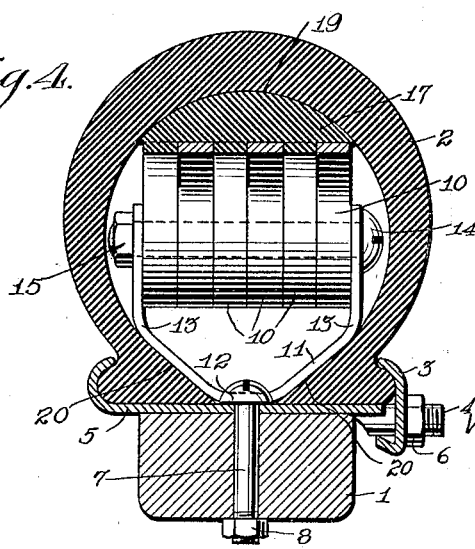
Fig. 4 is a view in transverse section on the line 4—4 of Fig. 1.

With reference to Fig. 2 it will be seen that the staggered arrangement of the links 9 leaves a staggered arrangement of depressions or interstices 16 between the intermediate portion of the links. I provide an annular filler band 17 of rubber or some similar resilient material which is substantially segmental in cross section as shown clearly in Fig. 4.

The transversely curved face of the filler band 17 is located against the inner face of the tire and the band is provided with a staggered arrangement of inwardly extending beveled lugs 18 conforming to the shape of the openings or recesses 16 and fitting therein. The lugs 18 prevent either lateral or circumferential movement of the filler band relative to the annular chain of links.

The filler band also effectively prevents engagement of the links with the tire shoe. It will be seen that when the shoe 2 is clamped within the rim the engagement of the filler band with the inner surface of the shoe at 19 and the engagement of the brackets with the inner surface of the shoe at 20 effectively prevents a radial or lateral displacement of the resilient chain relative to the shoe.

In assembling the device, I first assemble the chain and brackets, remove the rim section 3 from the felly and insert the filler band and the chain with its associated brackets under the free edge of the shoe. The rim section 3 may then be secured on clamping the parts in position.

The resiliency of the spring links lies entirely in the coils 10 and association of the coils 10 with the bolts 14 gives the desired spring action.

Various slight changes and alterations might be made in the general form of the parts described without departing from my invention and hence I do not wish to limit myself to the precise details set forth but shall consider myself at liberty to make such slight changes and alterations as fairly fall within the spirit and scope of the appended claims.

I claim:

1. In a tire, an annular chain of spring links located within the tire shoe, and devices preventing engagement of the links with the inner surface of the shoe.

2. The combination with a rim and shoe, of an annular chain of spring links located within the shoe, U brackets resting on the rim and engaging the inner surface of the shoe, bolts supported in the brackets and pivotally connecting the spring links, and an annular filler band around the links engaging the outer surfaces of the links and the inner surface of the shoe.

3. A new element in a tire, comprising an annular chain of spring links, said links of substantial inverted U-shape, the legs of the U forming coils.

4. As a new element in a tire, a resilient filler band substantially segmental in cross section, and engaging the inner surface of the tire, and provided with a staggered arrangement of inwardly projecting beveled lugs.

5. In a tire, an annular chain of spring links, said links substantially U-shaped, the legs of the U forming coils, said links arranged in groups of parallel links, the coils of each group of links located between and in alinement with the coils of an adjacent group, bolts passed through the alined coils, brackets supporting the bolts, said chain and its associated parts adapted to be inclosed in a tire shoe.

6. In a tire, an annular chain of spring links, said links substantially U-shaped, the legs of the U forming coils, said links arranged in groups of parallel links, the coils of each group of links located between and in alinement with the coils of an adjacent group, bolts passed through the alined coils, brackets supporting the bolts, said chain and its associated parts adapted to be inclosed in a tire shoe, said brackets spacing the coils from the inner surface of the shoe, and an annular resilient filler band located around the chain and preventing the engagement of the intermediate portion of the links and the inner surface of the shoe.

7. In a tire, an annular chain of spring links, said links substantially U-shaped, the legs of the U forming coils, said links arranged in groups of parallel links, the coils of each group of links located between and in alinement with the coils of an adjacent group, bolts passed through the alined coils, brackets supporting the bolts, said chain and its associated parts adapted to be inclosed in a tire shoe, said brackets spacing the coils from the inner surface of the shoe, an annular resilient filler band located around the chain and preventing the engagement of the intermediate portion of the links and the inner surface of the shoe, and a staggered arrangement of beveled lugs on the filler band interlocking in the interstices of the links.

8. In a tire, an annular chain of spring links, said links substantially U-shaped, the legs of the U forming coils, said links arranged in groups of parallel links, the coils of each group of links located between and in alinement with the coils of an adjacent group, bolts passed through the alined coils, brackets supporting the bolts, said chain and its associated parts adapted to be inclosed in a tire shoe, said brackets spacing the coils from the inner surface of the shoe, an annular resilient filler band located around the chain and preventing the engagement of the intermediate portion of the links and the inner surface of the shoe, a staggered arrangement of beveled lugs on the filler band interlocking in the interstices of the links, and said filler band and brackets preventing lateral or radial movement of the chain relative to the shoe and rim.

VRATISLAV KUBELKA.